(12) United States Patent
Murakami

(10) Patent No.: US 8,588,397 B2
(45) Date of Patent: Nov. 19, 2013

(54) COMMUNICATION CONTROL SYSTEM, COMMUNICATION CONTROL METHOD, AND RECORDING MEDIUM INCLUDING COMMUNICATION CONTROL PROGRAM

(75) Inventor: Masahiko Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 829 days.

(21) Appl. No.: 12/620,551

(22) Filed: Nov. 17, 2009

(65) Prior Publication Data

US 2010/0124324 A1    May 20, 2010

(30) Foreign Application Priority Data

Nov. 20, 2008    (JP) ................. 2008-296793

(51) Int. Cl.
*H04M 5/00* (2006.01)
*H04M 1/64* (2006.01)

(52) U.S. Cl.
USPC .................. 379/265.09; 379/88.17

(58) Field of Classification Search
USPC ............ 379/265.01, 265.04, 265.09
See application file for complete search history.

(56) References Cited

U.S. PATENT DOCUMENTS

| | | | | |
|---|---|---|---|---|
| 5,475,743 A | * | 12/1995 | Nixon et al. | 379/221.14 |
| 5,850,435 A | * | 12/1998 | Devillier | 379/374.02 |
| 7,574,745 B2 | * | 8/2009 | Yoneyama | 726/27 |
| 7,746,990 B1 | * | 6/2010 | Fabbrizio et al. | 379/114.13 |
| 2004/0039846 A1 | * | 2/2004 | Goss et al. | 709/248 |
| 2006/0062373 A1 | * | 3/2006 | Chervets et al. | 379/265.03 |
| 2006/0233104 A1 | | 10/2006 | Asukai et al. | |
| 2007/0115927 A1 | * | 5/2007 | Pearson | 370/352 |

FOREIGN PATENT DOCUMENTS

| | | |
|---|---|---|
| JP | 2006-157672 A | 6/2006 |
| JP | 2006-279218 | 10/2006 |
| JP | 2007-188189 | 7/2007 |
| JP | 2007-281580 A | 10/2007 |
| JP | 2007-312053 A | 11/2007 |

OTHER PUBLICATIONS

Japanese Office Action mailed Feb. 12, 2013 for corresponding Japanese Application No. 2008-296793, with English-language translation.

* cited by examiner

*Primary Examiner* — Ahmad Matar
*Assistant Examiner* — Nafiz E Hoque
(74) *Attorney, Agent, or Firm* — Fujitsu Patent Center

(57) ABSTRACT

A communication control system includes accessing a document data recording unit based on the information concerning a document and acquiring characteristic data indicating the characteristic of the document when receiving a call initiation request including at least information identifying a called party terminal and information concerning a document related to the call initiation request; accessing a status data recording unit based on information identifying the called party terminal included in the call initiation request and acquiring status data indicating a status of the called party terminal of the call initiation request; determining whether a call requested by the call initiation request is initiated or not based on the acquired characteristic data and the acquired status data; and executing a call initiation process depending on the determination by the call initiation determining unit.

6 Claims, 8 Drawing Sheets

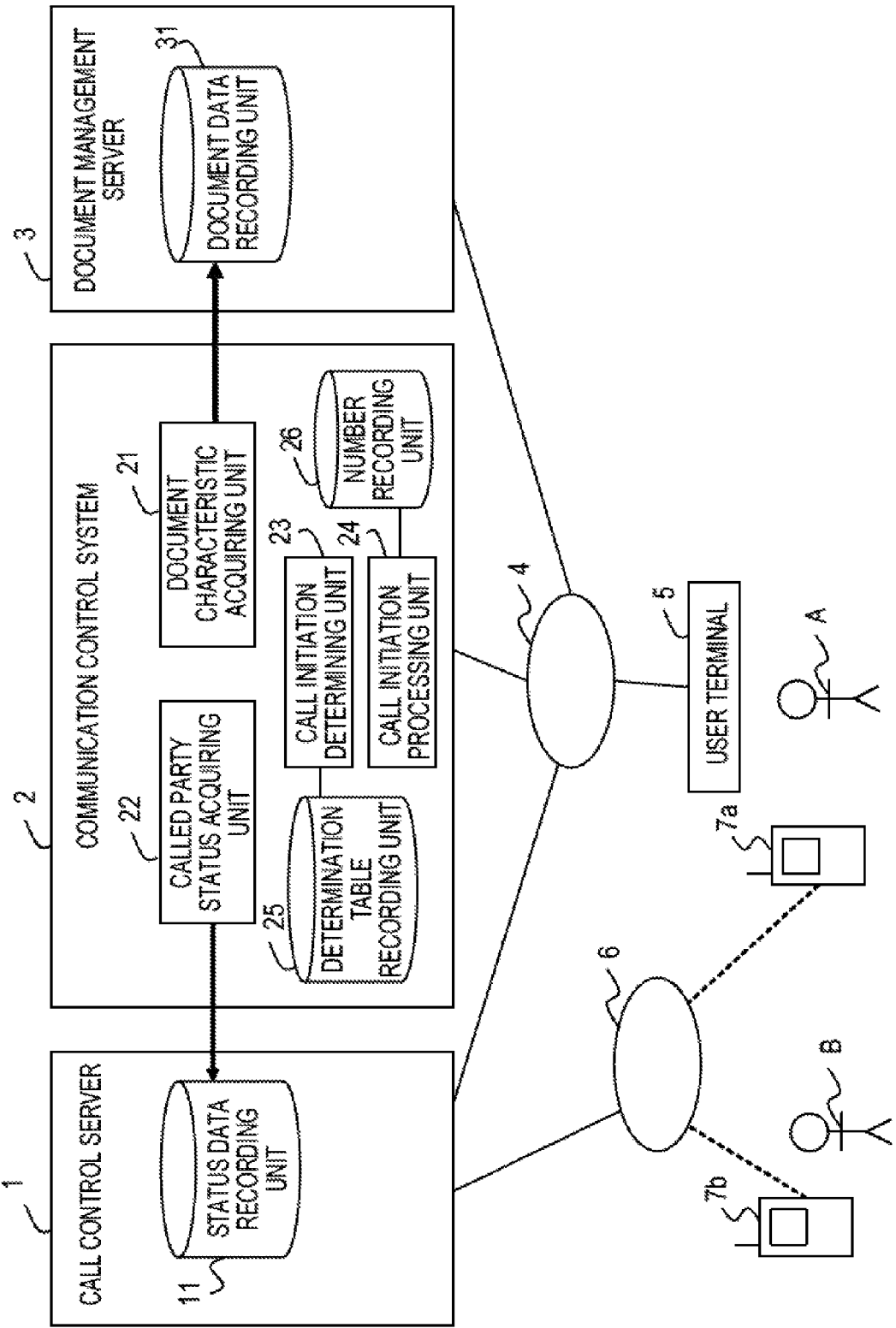

FIG. 2A

| URL | CONFIDENTIALITY LEVEL |
|---|---|
| himitsu.html | INTERNAL USE ONLY |
| Koukai.html | PUBLIC |

FIG. 2B

| TELEPHONE NUMBER | LOCATION STATUS |
|---|---|
| 1001 | EXTRA-COMPANY |
| 1002 | INTRA-COMPANY |

FIG. 2C

| DOCUMENT CHARACTERISTIC | CALLED PARTY STATUS | ACTION |
|---|---|---|
| INTERNAL USE ONLY | EXTRA-COMPANY | PREVENT |
| INTERNAL USE ONLY | INTRA-COMPANY | PERMIT |

FIG. 2D

| USER ID | TELEPHONE NUMBER |
|---|---|
| yama | 1111 |
| take | 3333 |

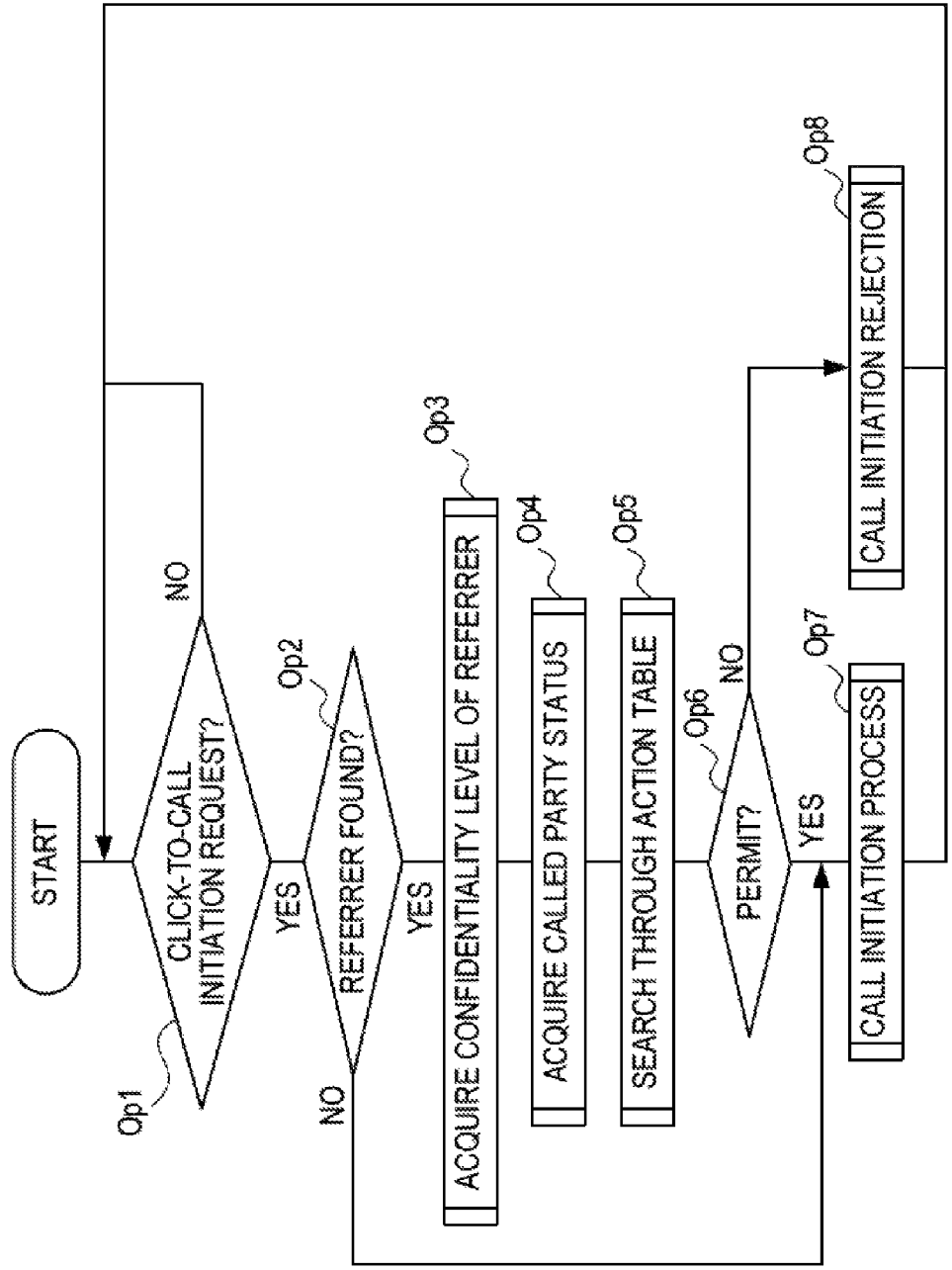

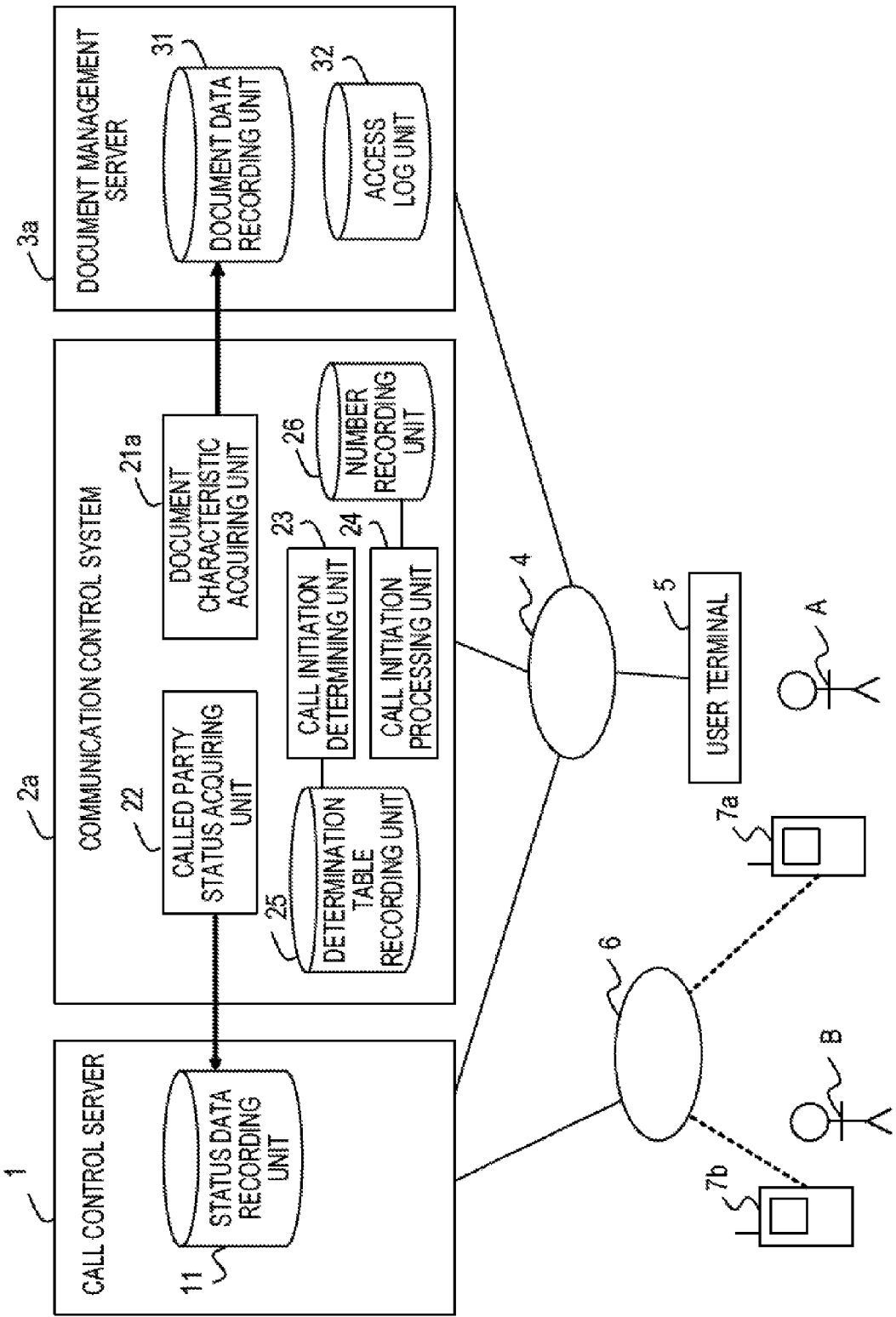

FIG. 5

| USER ID | URL | ACCESSED TIME |
|---------|-------------|----------------|
| take | himitsu.html | 2008/8/8 12:00 |
| yama | nanika.html | 2008/8/8 10:00 |
| ... | ... | ... |

COMMUNICATION CONTROL SYSTEM, COMMUNICATION CONTROL METHOD, AND RECORDING MEDIUM INCLUDING COMMUNICATION CONTROL PROGRAM

CROSS-REFERENCE TO RELATED APPLICATIONS

This application is based upon and claims the benefit of priority of the prior Japanese Patent Application No. 2008-296793, filed on Nov. 20, 2008, the entire contents of which are incorporated herein by reference.

FIELD

The embodiments discussed herein are related to a call control technology which receives a telephone call initiation request and performs call initiation processing.

BACKGROUND

A click-to-call system which enables a user to automatically initiate a telephone call simply by clicking a phone number or URL displayed on a screen of a terminal has been developed. The click-to-call system allows a user to, for example, readily make an inquiry about the current Web page (an example of a document) the user is browsing.

However, because users have become able to readily make inquiries, the following problem has arisen. For example, when an employee of a company uses click-to-call to make an inquiry about a confidential document to be kept secret from anyone outside of the company, the telephone call can be connected to a person in charge of the document who is outside of the company. In such a case, the person in charge cannot describe details of the document to the calling employee and so the calling employee and the person in charge cannot successfully communicate with each other because the person in charge is from outside of the company. In such a situation, both the employee making the inquiry and the person receiving the inquiry are confused.

On the other hand, a person in charge who receives the inquiry may unknowingly talk about the details of the confidential document. This can lead to leakage of the confidential information and can severely damage the business. The problem is not limited to click-to-call; the problem can occur in any other telephone call initiation.

To prevent the problem, initiation of calls from a company to outside the company, that is, redirection of intra-company calls to outside numbers, may be inhibited. However, this method also prevents employees from making calls that are not related to confidential information and impairs the convenience of mobile phones.

Therefore, a system has been proposed for controlling connection of communication links based on information in which the states of both calling and called users are reflected in order to connect only communications useful to the users (see Japanese Patent Application Laid-Open No. 2006-279218, for example).

SUMMARY

Aspects of the embodiments are related to a communication control system which receives a call initiation request and executes a call initiation process based on the received call initiation request. The communication control system includes a document characteristic acquiring unit that accesses a document data recording unit which records a document or a characteristic of the document based on information concerning the document and acquires characteristic data indicating the characteristic of the document, when receiving a call initiation request including at least information identifying a called party terminal and information concerning a document related to the call initiation request; a called party status acquiring unit that accesses a status data recording unit which records a status of a potential called party terminal based on information identifying the called party terminal included in the call initiation request and acquires status data indicating a status of the called party terminal of the call initiation request; a call initiation determining unit that determines whether a call requested by the call initiation request is initiated or not based on the characteristic data acquired by the document characteristic acquiring unit and the status data acquired by the called party status acquiring unit; and a call initiation processing unit that executes a call initiation process depending on the determination by the call initiation determining unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a general configuration of a system including a communication control system according to a first embodiment of the present invention;

FIG. 2A illustrates an example of data indicating characteristics of documents recorded in a document data recording unit;

FIG. 2B illustrate an example of status data recorded in a status data recording unit;

FIG. 2C illustrates an example of a determination table recorded in a determination table recording unit;

FIG. 2D illustrates an example of corresponding number data;

FIG. 3 is a flowchart illustrating an example of an operation of the communication control system;

FIG. 4 illustrates a general configuration of a system including a communication control system according to a second embodiment of the present invention;

FIG. 5 illustrates an example of an access log;

DESCRIPTION OF EMBODIMENTS

Figure 6:
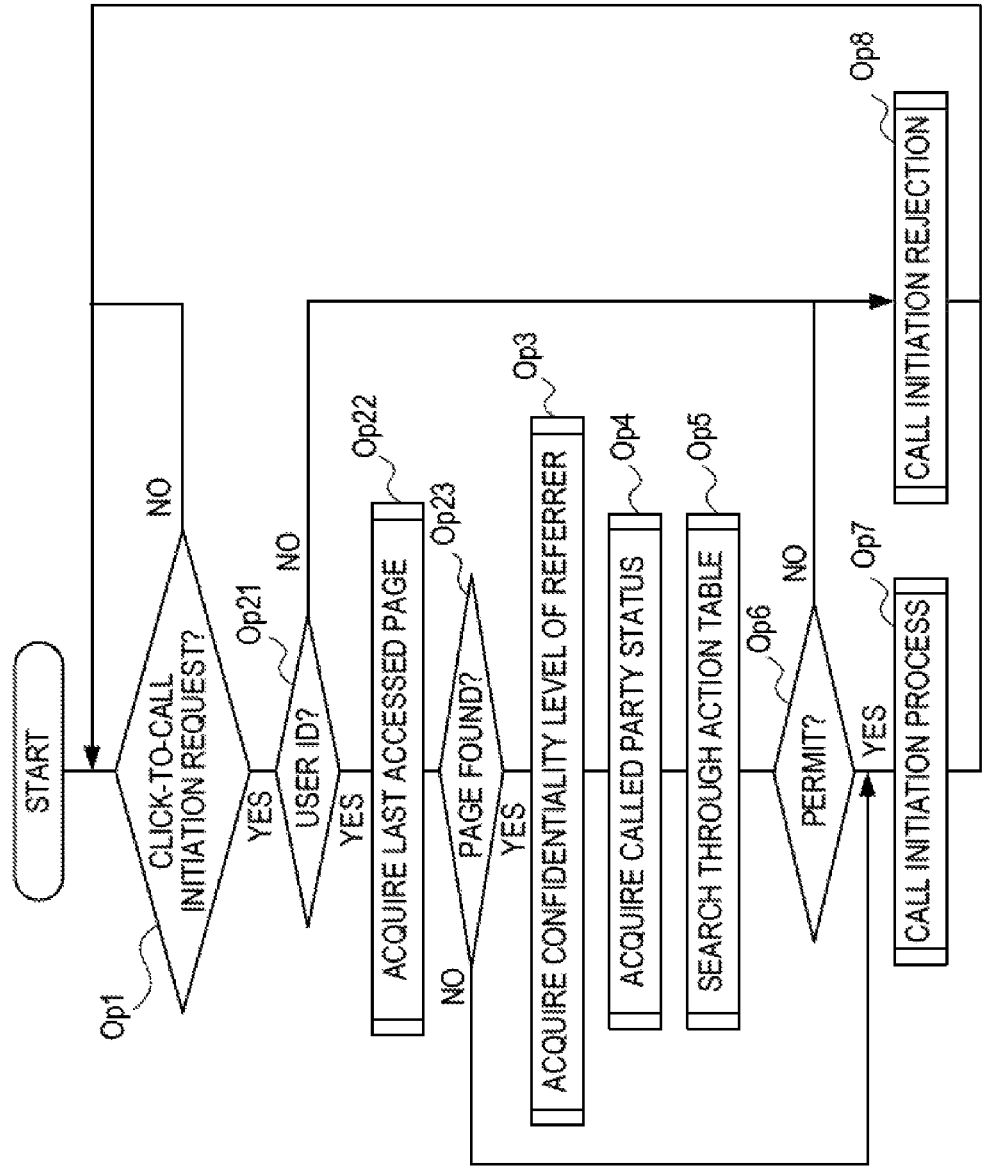
FIG. 6 is a flowchart illustrating an example of an operation of the communication control system 2a according to the second embodiment.

However, the existing technique described above is not able to appropriately control call initiation according to the nature of a call and the status of the called party terminal. Therefore, an object of the present invention is to enable appropriate control of call initiation according to the nature of a call and the status of the called party terminal.

First Embodiment

[System Configuration]

FIG. 1 illustrates a general configuration of a system including a communication control system according to a first embodiment. The system in FIG. 1 includes a call control server 1, a communication control system 2, a document management server 3, and a user terminal 5, which are interconnected through a network 4. The call control server 1 is connected to a telephone network 6 including telephone terminals 7a, 7b.

[Document Management Server 3]

The document management server 3 in the system in FIG. 1 includes a document data recording unit 31 storing documents accessible to the user terminal 5. While the contents of the documents are not limited as such, the present embodiment will be described with respect to an example in which each document contains contact information such as a telephone number to which inquiries about the document may be made. The document management server 3 may be an HTTP server that uses an HTTP protocol to provide a document on a page-by-page basis, for example.

[User Terminal 5]

The user terminal 5 includes the functions of acquiring and displaying a document from the document management server 3 based on an input from a User A, and sending a voice call initiation request based on the input from User A to the communication control system 2. The user terminal 5 may be a computer on which a browser is installed, for example. When the user terminal 5 accepts an input from User A instructing the terminal 5 to acquire a document, the user terminal 5 acquires the document stored in the document data recording unit 31 from the document management server 3 and displays the acquired document on the display of the user terminal 5. The user terminal 5 also accepts a specification of contact information (for example a telephone number) contained in the document displayed and a request to initiate a call to the telephone number from the User A. For example, User A clicks on the telephone number or a given button in the displayed document to specify the telephone number and to issue the call initiation request. The user terminal 5 receives the call initiation request and sends the call initiation request to the communication control system 2. The call initiation request contains the telephone number specified by the User A (the called party's telephone number).

For example, an HTTP protocol may be used in communications among the user terminal 5, the document management server 3, and the communication control system 2. When a telephone number in a document is clicked, a browser on the user terminal 5 sends an HTTP request to the communication control system 2. The HTTP request may include the user ID of the User A, the clicked telephone number, and the URL of the document displaying the telephone number. This enables the call initiation request to be sent to the communication control system 2 together with information identifying the calling user, the called party's telephone number, and information for accessing the related document. The present embodiment will be described with respect to an example of a click-to-call in which a telephone call may be initiated by clicking on a telephone number or a button displayed on the screen of the user terminal 5.

The process performed on the user terminal 5 is not limited to browser processes that use the HTTP protocol. Also, communication software may be automatically activated when a telephone number in a document displayed in the browser is specified, and the communication software may execute a call initiation process.

[Communication Control System 2]

The communication control system 2 receives a call initiation request, and determines whether the call should be initiated or not based on the document relating to the call and the status of the called party terminal. If the communication control system 2 determines that the call should be initiated, the communication control system 2 requests the call control server 1 to execute a call initiation process. The communication control system 2 includes a document characteristic acquiring unit 21, a called party status acquiring unit 22, a call initiation determining unit 23, a call initiation processing unit 24, a determination table recording unit 25, and a number recording unit 26.

The document characteristic acquiring unit 21 accepts information relating to the document related to a call initiation request (for example the URL of the document) when the communication control system 2 accepts the telephone call initiation request from the user terminal 5, for example. The document characteristic acquiring unit 21 accesses the document data recording unit 31 of the document management server 3 to acquire characteristic data indicating a characteristic of the document based on the URL of the document.

For example, the document characteristic acquiring unit 21 may acquire the characteristic data from data that indicates the characteristic of the document and is associated and recorded with the URL of the document in the document data recording unit 31 or may access the document itself to generate characteristic data from the content of the document. The characteristic data may be any data that indicates the characteristic (nature) of the document. The present embodiment will be described with respect to an example in which a confidentiality level representing the bounds within which the document is permitted to be shared is acquired as the characteristic data.

FIG. 2A illustrates an example of data indicating the characteristics of documents associated and recorded with the URLs of the documents in the document data recording unit 31. In the example illustrated in FIG. 2A, information indicating the confidentiality levels ("INTERNAL USE ONLY" or "PUBLIC") is recorded for each document URL.

The called party status acquiring unit 22 accesses a status data recording unit 11 in the call control server 1 to acquire status data indicating the status of a called party terminal called by a call initiation request received at the communication control system 2. The call control server 1 may acquire, for example, data indicating the status from each telephone terminal 7a and 7b capable of communicating through the telephone network 6 and record the data in the status data recording unit 11.

The data indicating the status may be any data that represents the status of the terminal. The present embodiment will be described with respect to an example in which the location status of the telephone terminal is acquired as the status data. If a telephone terminal is an Internet Protocol (IP) phone, the location status functionality may be implemented by using the SIMPLE (SIP for Instant Messaging and Presence Leveraging Extensions) standard, for example. In this case, the call control server 1 acts as a location status server and each telephone terminal 7a and 7b acts as a PUA (Presence User Agent).

FIG. 2B illustrates an example of status data recorded in the status data recording unit 11. In the example in FIG. 2B, the telephone numbers of telephone terminals and their location statuses are recorded in association.

The call initiation determining unit 23 uses characteristic data acquired by the document characteristic acquiring unit 21 and status data acquired by the called party status acquiring unit 22 to determine whether a call requested by a call initiation request received by the communication control system 2 should be initiated or not. Recorded in the determination table recording unit 25 is a determination table containing data indicating conditions for executing a call initiation process. The call initiation determining unit 23 refers to the determination table recorded in the determination table recording unit 25 and compares the combination of the acquired characteristic data and status data against the conditions in the determination table to determine whether the call should be initiated or not.

FIG. 2C illustrates an example of a determination table recorded in the determination table recording unit 25. In the determination table of the example in FIG. 2C, multiple combinations of characteristic data (document characteristics) and status data (called party statuses) and actions ("PERMIT" or "PREVENT") for the combinations are recorded in association with each other. If the action for a combination of acquired characteristic data and status data is "PERMIT", the call initiation determining unit 23 determines that the call should be initiated; if the action is "PREVENT", the call initiation determining unit 23 determines that the call should not be initiated.

The determination by the call initiation determining unit 23 is not limited to the determination made by using the determination table. For example, a function (method) that uses characteristic data and status data as arguments and returns the result of determination as return values may be executed.

The call initiation processing unit 24 executes a call initiation process depending on the result of determination made by the call initiation determining unit 23. For example, if the call initiation determining unit 23 determines that a call should be initiated, the call initiation processing unit 24 provides the telephone number of the calling user's telephone terminal and the telephone number of the called party telephone terminal to the call control server 1 and requests the call control server 1 to establish a call connection between the telephone numbers. If the call initiation determining unit 23 determines that a call should not be initiated (should be prevented), the call initiation processing unit 24 prevents initiation of the call requested by the call initiation request.

If the communication control system 2 receives an identifier of a calling user together with the call initiation request, the call initiation processing unit 24 refers to the number recording unit 26 to convert the identifier of the calling user to the telephone number of the calling user. The resulting telephone number is included in a call connection request to be provided to the call control server 1 together with the telephone number of the called party telephone terminal. Therefore, corresponding number data is recorded in the number recording unit 26 that associates the identifiers of calling users with their respective telephone numbers. FIG. 2D illustrates an example of corresponding number data. In the example in FIG. 2D, telephone numbers are associated and recorded with the identifiers of users.

[Call Control Server 1]

The call control server 1 controls call connections between telephone terminals 7a and 7b on the telephone network 6. The call control server 1 also has the function of receiving the telephone numbers of calling and called party terminals together with a call connection request from the call initiation processing unit 24 of the communication control system 2 and initiating a call connection between the telephone terminals. For example, if the telephone network 6 is an IP telephone network, the call control server 1 may function as an SIP server; if the telephone network 6 is a switched network, the call control server 1 may be a switch.

The call control server 1, the communication control system 2, the document management server 3, and the user terminal 5 may be specialized apparatuses containing a computer, or general-purpose computers such as personal computers or server machines. The functions of the functional units of the communication control system 2, including the called party status acquiring unit 22, the document characteristic acquiring unit 21, the call initiation determining unit 23, and the call initiation processing unit 24 are implemented by a processor of a computer executing a given program. Therefore, the program causing a computer to function as the functional units and a recording medium on which the program is recorded are also included in embodiments of the present invention. The same applies to the functional units in FIGS. 4 and 8, which will be described later. The determination table recording unit 25 and the number recording unit 26 are embodied by a recording medium embedded in the computer or an external recording medium accessible to the computer.

The system configuration that implements the functions described above is not limited to the one illustrated in FIG. 1. For example, the communication control system 2 may be implemented by installing a program for implementing the functional units on the same computer as any of the call control server 1, the document management server 3, and the user terminal 5. While the document management server 3 and the communication control system 2 are configured on separate servers in the example in FIG. 1, they may be configured on the same server. The user terminal 5 and a telephone terminal 7a may also be configured on the same terminal.

[Example of Operation of the System]

<Example of Operation of the User Terminal 5>

Example of operation in the system illustrated in FIG. 1 will be described in which the user terminal 5 in the system sends a call initiation request to the communication control system 2. The User A uses the user terminal 5 to log in the document management server 3. In the example, the User A has the user ID "take".

The User A accesses a page (document) relating to "Announcement of new PC" (with the URL http://sales.example.com/himitsu.html), for example, recorded in the document data recording unit 31 of the document management server 3 by using a browser on the user terminal 5. The document contains a click-to-call link, "Contact: Sales Representative Yamashita (1001)", so that users may readily make an inquiry to the sale representative by phone. Here, the URL of the link is "http://click2call.example.com/click2call?userid=take&dest=1001," for example. In the URL, "click2call.example.com" represents the communication control system 2 that provides the click-to-call system. The section "userid=take" of the link has been automatically added by the document management server 3 using the user ID, "take", of the User A, which has been input during the login. This enables information identifying the call initiator (caller) to be provided to the communication control system 2. The method for identifying the caller to the communication control system 2 is not limited to this. For example, user information may be provided from the document management server 3 to the communication control system 2 in cooperation with a known single-sign-on system.

When the User A clicks on the link displayed on the screen of the user terminal 5, the following HTTP request is issued to the communication control system 2 (click2call.example.com).

GET/clickcall?userid=take&dest=1001
Referrer:http://sales.example.com/himitsu.html The "Referrer:" header is specified in the HTTP specification and is a header that allows a linked site to identify the page containing the link. The browser on the user terminal 5 automatically adds the header to the request and sends the HTTP request. Thus the call initiation request is sent to the communication control system 2.

<Example of Operation of the Communication Control System 2>

FIG. 3 is a flowchart illustrating an example of an operation by the communication control system 2 in the system illustrated in FIG. 1. As illustrated in FIG. 3, when the communication control system 2 receives a call initiation request from the user terminal 5 by click-to-call for example ("yes" at Op1), the communication control system 2 determines whether there is a document (Referrer) related to the call initiation request (Op2). Whether there is a related document or not may be determined based on, for example, whether or not the call initiation request includes information concerning the document (for example the URL of the document).

An example will be described in which a page (document) in the document management server 3 is displayed on the user terminal 5. When a telephone number contained in the page displayed on the user terminal 5 is clicked on, a click-to-call call initiation request is provided to the communication control system 2 as an HTTP request. Here, the Referrer: header in the request provided contains the URL of the page. The communication control system 2 may determine that there is the related document (referrer) if the Referrer: header of the HTTP request received contains the URL.

In this way, whether there is a document related to the call initiation request may be determined based on whether the call initiation request contains information indicating the page (document) the caller was referring to when the user issued the call initiation request in addition to information identifying the call initiator and the called party.

If there is no document related to the call initiation request ("no" at Op2), the call initiation processing unit 24 executes a call initiation process (Op7). On the other hand, if there is a document related to the call initiation request ("yes" at Op2), the document characteristic acquiring unit 21 asks the document management server 3 for the characteristic data (the confidentiality level in this example) of the document (referrer) and acquires the characteristic data (Op3).

At Op3, the document characteristic acquiring unit 21 may access the document data recording unit 31 of the document management server 3 based on the URL contained in the Referrer: header. For example, if the URL in the Referrer: header is "http://example/himitsu.html" and data indicating the characteristic of the document illustrated in FIG. 2A is recorded in the document data recording unit 31, the document characteristic acquiring unit 21 acquires the characteristic data, "INTERNAL USE ONLY", corresponding to "himitsu.html" in the URL from the data illustrated in FIG. 2A.

The called party status acquiring unit 22 acquires status data of the called party telephone terminal from the status data recording unit 11 of the call control server 1 based on the telephone number of the called party contained in the call initiation request (Op4). For example, the called party status acquiring unit 22 acquires the telephone number "1001" of the called party from the parameter "dest=1001" in the HTTP request and asks the call control server 1 whether the user holding the telephone number "1001" is on the company premises or not. The call control server 1 manages information indicating whether the employees are on the company premises or not, for the purpose of call redirection (the function of redirecting a call originated from an extension number of the company to an external number) with the status data recording unit 11, for example.

For example, if the status data illustrated in FIG. 2B is recorded in the status data recording unit 11, the called party status acquiring unit 22 acquires the location status "EXTRA-COMPANY" associated with the telephone number "1001" as the status data. In an environment in which there is a location status server that provides intra-/extra-company information in addition to the call control server 1, the inquiry may be made to the location status server.

Then, the call initiation determining unit 23 accesses the determination table in the determination table recording unit 25 and searches for data corresponding to the combination of the characteristic data "INTERNAL USE ONLY" of the document acquired at Op3 and the status data "EXTRA-COMPANY" acquired at Op4 (Op5).

For example, if the data illustrated in FIG. 2C is contained in the determination table, the call initiation determining unit 23 acquires the action "PREVENT" which corresponds to the combination of the document characteristic (characteristic data) "INTERNAL USE ONLY" and the called party status (e.g., location status data) "EXTRA-COMPANY" as the result of the search. In this example, information indicating that if the confidentiality level is "INTERNAL USE ONLY" and the called party location status is "extra-company", information to "PREVENT" the call is recorded previously in the determination table. Therefore the action "PREVENT" is retrieved. If the characteristic data of the document acquired at Op3 were "INTERNAL USE ONLY" but the called party status data acquired at Op4 were "INTRA-COMPANY", the action "PERMIT" would be retrieved as the search result.

The call initiation determining unit 23 determines, based on the search result, whether or not the call initiation process is to be permitted or not (Op6). For example, if the search result is "PREVENT" ("no" at Op6), the call initiation determining unit 23 does not permit the call initiation processing unit 24 to perform the call initiation process, but instead causes the call initiation processing unit 24 to execute a call initiation rejection process (Op8). If the search result is "PERMIT", the call initiation determining unit 23 causes the call initiation processing unit 24 to execute a call initiation process (Op7).

In the call initiation process at Op7, the call initiation processing unit 24 sends a call connection request to the call control server 1. The call connection request includes the telephone numbers of the caller and the called party. The call initiation processing unit 24 may refer to the corresponding number data in the number recording unit 26 to acquire the telephone number of the calling user. For example, if the calling user ID received by the communication control system 2 together with the call initiation request is "take", the call initiation processing unit 24 may acquire the telephone number "3333" associated with "take" in the corresponding number data illustrated in FIG. 2D as the caller's telephone number.

In the call initiation rejection process at Op8, the call initiation processing unit 24 returns, for example, a page containing a message that initiation of the call is prevented to the calling user terminal 5. For example, the call initiation processing unit 24 may return a page containing the message "The called person is unavailable to talk about the subject on the phone at the moment." in response to the HTTP request.

In the call initiation rejection process at Op8, the so-called answering phone service may be performed in which a voice message from the calling user is accepted and recorded in such a manner as to be accessible to the called party telephone terminal.

The operation described above enables call initiation control that, for example, prevents initiation of a call if the documentation characteristic indicates "internal use only" and the called party status indicates "extra-company". That is, there is provided a mechanism that automatically determines based on the nature of an inquiry whether to connect the call or not. Consequently, initiation of an inappropriate call may be reduced if not prevented. Examples of specific advantageous effects will be described below.

For example, called parties do not need to be concerned about receiving inquiries about confidential documents while they are in a situation in which they cannot talk about confidential information. Calling parties also do not need to make a determination as to whether to initiate a call or not by taking into consideration what condition the called party is in. Thus, smooth communication may be accomplished. In terms of information management, employees being away from the company are prevented from leaking confidential information in response to a telephone inquiry about confidential information.

<Op3: Variations of Document Characteristic Acquisition Process>

At Op3, the document characteristic acquiring unit 21 may access the document itself instead of the document characteristic data, and may generate characteristic data from the content of the document. In the example described above, the document characteristic acquiring unit 21 may access a page (document) in the document management server 3 indicated by the URL in the Referrer: header of the call initiation request by using the HTTP protocol and may identify the confidentiality level based on whether the character string "internal use only" is contained in the document. For example, whether the characteristic of a document is confidential or not may be determined based on whether or not a term such as "internal use only" or "confidential" that defines a confidentiality level appears in the document.

The document characteristic acquiring unit 21 may acquire not only characteristic data of a page indicated by a URL but also characteristic data of a page pointed to by a link from that page. For example, in the case of a PDF document, a page for accessing the PDF document, instead of the PDF document itself, may contain a click-to-call link. In such a case, the PDF document is actually the related document. Therefore, in addition to a page in which a click-to-call link is provided, a page that may be accessed by following the link in the page may be included in related documents. For example, the document characteristic acquiring unit 21 may also acquire the characteristic data of a page pointed to by the URL of a click-to-call link contained in another page.

<Variations of the Determination Table>

While the embodiment has been described with respect to an example in which the determination table is recorded beforehand, the communication control system 2 may generate or update a determination table by monitoring call statuses. For example, the communication control system 2 may record characteristic data of a related document, called party situation data, and the call status (for example call duration) of each call connected and may generate a determination table based on the recorded data. That is, the communication control system 2 may lean the relation between a characteristic-data and status-data combination and call inappropriateness and may reflect the relation in the determination table.

For example, if the number of calls with a particular combination of characteristic data and status data (for example the combination of document characteristic data "INTERNAL USE ONLY" and the called party status data "EXTRA-COMPANY") that end in 5 seconds or fewer after the initiation of the call exceeds a threshold, it may be determined that the calls with the combination are inappropriate. In this case, the communication control system 2 records information indicating that any calls with the combination of the document characteristic "INTERNAL USE ONLY" and the called party status "EXTRA-COMPANY" should be prevented in the determination table.

In this way, the determination table may be automatically generated and updated based on call states, so that a proper situational determination may be made.

<Other Examples of Character and Status Data>

The document characteristic acquiring unit 21 may acquire data indicating the department that has provided a document as the characteristic data of the document and the called party status acquiring unit 22 may acquire data indicating the department to which the called party currently belongs. If a document providing department providing the document indicated by the data acquired by the document characteristic acquiring unit 21 does not match the current department of the called party indicated by the data acquired by the called party status acquiring unit 22, the call initiation determining unit 23 may determine that initiation of the call is to be prevented.

Therefore, when a person in charge of a particular document has transferred from the department and is no longer in charge, telephone inquiries about the document may be prevented from being connected to the person. This effect is especially advantageous for a system in which telephone numbers are not changed when employees are reassigned to other departments.

Second Embodiment

FIG. 4 illustrates a general configuration of a system including a communication control system 2 according to a second embodiment. In FIG. 4, the same components as those in FIG. 1 are assigned the same reference numerals.

[System Configuration]

In the system illustrated in FIG. 4, a document management server 3a includes an access log unit 32. The access log unit 32 records an access log indicating a log of user access to a document data recording unit 31. FIG. 5 illustrates an example of an access log. In the example illustrated in FIG. 5, the IDs of users who accessed documents, URLs of the documents, and accessed times are recorded in order of access.

A document characteristic acquiring unit 21a receives the ID of a calling user and the telephone number of the called party from a user terminal 5 as a call initiation request. In response to the call initiation request, the document characteristic acquiring unit 21a refers to the access log in the access log unit 32 of the document management server 3a to identify the document that the calling user last accessed. The document characteristic acquiring unit 21a then acquires the characteristic data of the identified document from the document data recording unit 31. The characteristic data acquired is similar to that in the first embodiment. In this way, the document characteristic acquiring unit 21a in the second embodiment may use the log information maintained by the document management server 3a to acquire the characteristic data of the page that a calling user last accessed.

[Example of Operation]

FIG. 6 is a flowchart illustrating an example of an operation of the communication control system 2a according to the second embodiment. In the example illustrated in FIG. 6, when the communication control system 2a receives a call initiation request by click-to-call from a user terminal 5 for example ("yes" at Op1), the communication control system 2*a* determines whether or not the call initiation request contains a user ID (Op21).

The description of the example of an operation will be described with respect to an example in which the call initiation request sent to the communication control system 2*a* is an HTTP request which does not include a Referrer: header. Some firewall setups of browsers or OS's filter out Referrer: headers for security reasons.

In such a case, when User A clicks on the link in a document displayed on the user terminal 5, an HTTP request given below is issued to the communication control system 2*a* which functions as a click-to-call system (with the URL click2call.example.com). The HTTP request does not include a Referrer: header.

GET/clickcall?userid=take&dest=1001

The HTTP request contains the calling user's ID "take" and the called party's telephone number "1001". The communication control system 2*a* determines that the HTTP request includes the user ID ("yes" at Op21).

When determination at Op21 is "yes", the document characteristic acquiring unit 21*a* requests a page access log of the user having the user ID "take" from the document management server 3*a* (Op22). The document characteristic acquiring unit 21*a* then identifies, from the page access log, a document related to the call initiation request, namely the page whose characteristic data is to be acquired. For example, the page that the user with the user ID "take" most recently accessed in the access log in the access log unit 32 is the page whose characteristic data is to be acquired. If the access log illustrated in FIG. 5, for example, is recorded, the page with the URL "himitsu.html" associated with the user ID "take" is the page whose characteristic data is to be acquired.

If there is a page the characteristic data of which is to be acquired as in this example ("yes" at Op23), the document characteristic acquiring unit 21*a* acquires the characteristic data of that page as characteristic data of the document related to the call initiation request (Op3). The process sequence Op3 through Op8 is the same as the process sequence Op3 through Op8 illustrated in FIG. 3.

Third Embodiment

Figure 7:
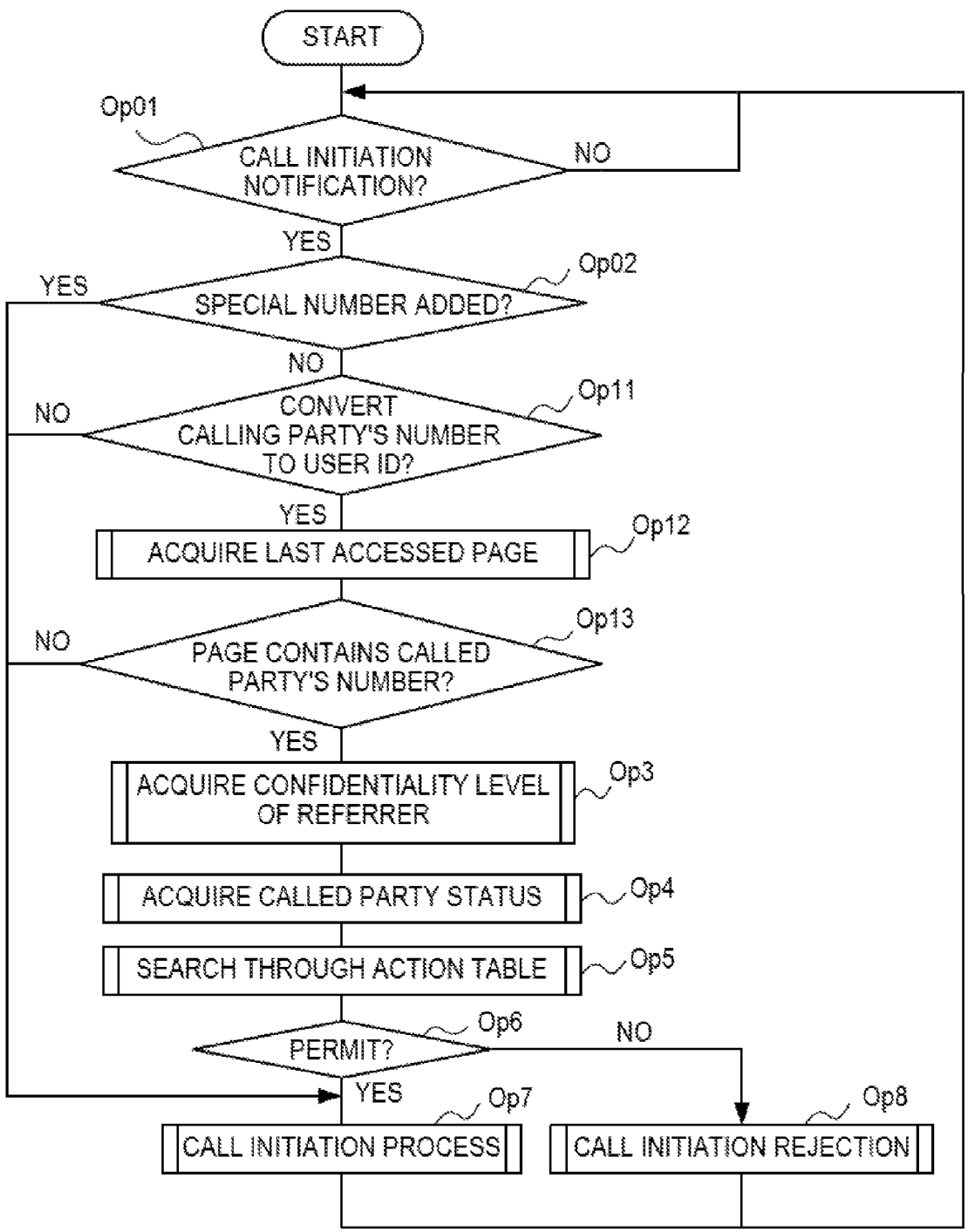
FIG. 7 is a flowchart illustrating an example of an operation of a call control server and a communication control system according to a third embodiment.

A third embodiment is a variation of the operation of the system illustrated in FIG. 4 of the second embodiment. In the second embodiment, the User A sends a call initiation request from the user terminal 5 by click-to-call. In the third embodiment, the User A makes a telephone call (call initiation request) from a telephone terminal 7*a* to a call control server 1. FIG. 7 is a flowchart illustrating example of an operation by the call control server 1 and a communication control system 2*a* according to the present embodiment. An example will be described below in which the telephone number of a person in charge is contained in a page (document) displayed on a user terminal 5A and the User A refers to the telephone number and inputs the telephone number of the person in charge on the telephone terminal 7*a* to initiate a call.

In FIG. 7, the call control server 1 receives the call initiation request (call initiation notification) from the User A ("yes" at Op01) and determines whether a special number is added to the telephone number of the called party included in the call initiation request (Op02).

The special number is a special-purpose identification number and is sent, for example, by operating a telephone terminal by a user when initiating a call. For example, when a user makes a call to the telephone number "1111" of an intended party, the user adds the special number "199" to the telephone number "1111". The user enters the number "1991111" on the telephone terminal to initiate the call. It is assumed in the example of operation that a rule has been established on the telephone network 6 that when "199" is added to a telephone number to initiate a call, determination as to whether the call is allowed to be initiated or not should be omitted. The determination based on the special number as to whether a call should be allowed or not is optional.

If the special number is not added ("no" at Op02), the call control server 1 provides the telephone numbers of the calling and called parties to the communication control system 2*a* and requests the communication control system 2*a* to determine whether the call is allowed to be initiated or not. If the special number is added ("yes" at Op02), a call initiation process (call connection) is performed at the call control server 1 (Op7).

If determination at Op02 is "no", the communication control system 2*a* converts the caller's telephone number to a user ID (Op11). In doing this, the communication control system 2*a* refers to corresponding number data in a number recording unit 26. For example, if the caller's telephone number is "3333", the communication control system 2*a* refers to the corresponding number data illustrated in FIG. 2D and acquires the user ID "take" associated with the telephone number "3333".

When the telephone number is successfully converted to the user ID ("yes" at Op11), the document characteristic acquiring unit 21*a* acquires from an access log unit 32 of a document management server 3*a* the URL of the page that the user with the user ID "take" last accessed (Op12). For example, the document characteristic acquiring unit 21*a* acquires the URL "himitsu.html" last accessed by the user with the user ID "take" from the access log illustrated in FIG. 5.

Here, the document characteristic acquiring unit 21*a* may compare the last accessed time by the user with the user ID "take" with the current time and, if the access was not made within a specific time interval, may deselect the URL. By excluding a document accessed by the user before a specific time interval from the documents the characteristic of which is to be acquired (documents related to the call initiation request), the document related to the call initiation request may be selected more accurately. This may prevent a call initiation from being rejected due to page access made many days ago, for example.

The document characteristic acquiring unit 21*a* determines whether the page pointed to by the acquired URL contains the telephone number of the called party (Op13). If the page contains the called party's telephone number ("yes" at Op13), the document characteristic acquiring unit 21*a* acquires the characteristic data of the page (Op3).

In this way, the document characteristic acquiring unit 21*a* is capable of identifying the page (document) that was accessed by the calling user and contains the contact information (telephone number) of the called party as the document related to the call initiation request. This enables the document related to the call initiation request to be identified even if the call is made without specifying the telephone number displayed on the document (by using click-to-call).

The process sequence Op3 through Op8 is performed in the same manner as the process sequence Op3 through Op8 illustrated in FIG. 1. As has been described, according to the third embodiment, a document related to a call may be identified and determination as to whether the call should be initiated or not may be made by taking into consideration the characteristic of the document and the status of the called party without using click-to-call.

Fourth Embodiment

Figure 8:
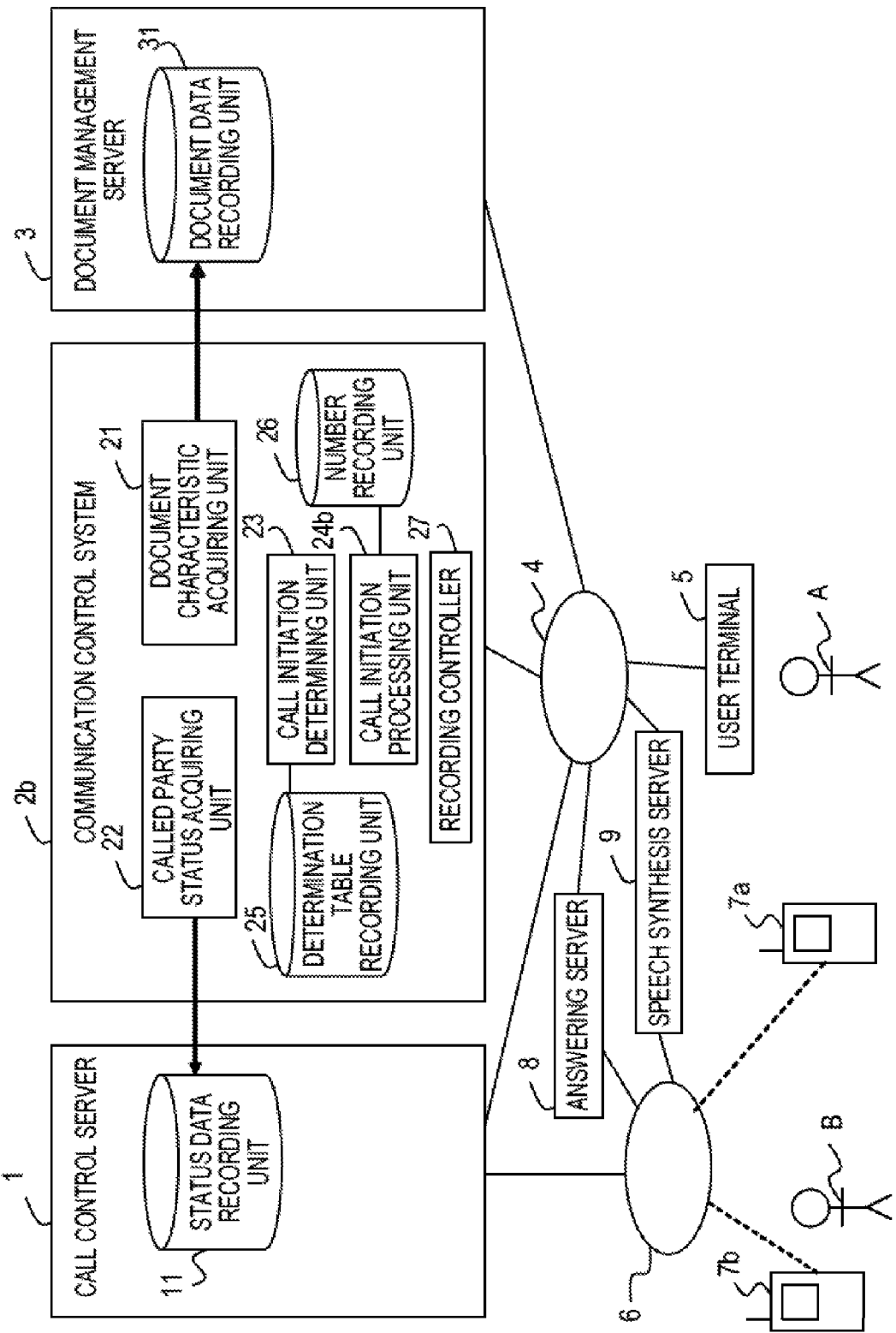
FIG. 8 illustrates a general configuration of a system including a communication control system according to a fourth embodiment of the present invention.

FIG. 8 is a functional block diagram illustrating a general configuration of a system including a communication control system according to a fourth embodiment. The functional blocks in the FIG. 8 that are the same as those in FIG. 1 are assigned the same reference numerals. In the fourth embodiment, answering and redirection processing is performed to allow a calling user to leave a message when it is determined that initiation of the call should be prevented.

[System Configuration]

An answering server 8 and a speech synthesis server 9 are connected to the telephone network 6 and the network 4. The communication control system 2b further includes a recording controller 27.

The answering server 8 provides a so-called answering phone service that accepts an input voice message from a calling user and records the voice message in such a manner as to be accessible to the called party telephone terminal.

The speech synthesis server 9 is a server that synthesizes voice data from input text and outputs the synthesized voice.

A call initiation processing unit 24b of the communication control system 2b forwards a call initiation request to the answering server 8 if a call initiation determining unit 23 determines that initiation of the call should be prevented. In response to this, the answering server 8 records the voice message input by the calling user in such a manner as to be accessible to the called user.

If the call initiation determining unit 23 determines that initiation of a call should be prevented, the recording controller 27 requests the speech synthesis server 9 to synthesize speech from text containing information concerning the document related to the call initiation request. In response to the request, voice data containing the information concerning the document is generated. For example, the recording controller 27 generates text describing a characteristic of the document from characteristic data acquired by the document characteristic acquiring unit 21 and sends the text to the speech synthesis server 9.

When the recording controller 27 requests the speech synthesis server 9 to synthesize speech, the call initiation processing unit 24b connects the speech synthesis server 9 with the answering server 8. This enables the answering server 8 to record the voice data containing information concerning the document that has been synthesized at the speech synthesis server 9 in such a manner as to be accessible to the called user.

[Example of Operation]

An example of an operation of the system according to the fourth embodiment will be described next. The operation sequence from reception of a call initiation request at the communication control system 2b to the determination by the call initiation determining unit 23 is the same as that in the first to third embodiments.

If the call initiation determining unit 23 determines to prevent initiation of the call, the call initiation processing unit 24b responds to the sent HTTP request by returning a page containing a message, for example "The called person is unavailable to talk about the subject on the phone at the moment. The call will be forwarded to the answering phone." When the calling user (User A) clicks on a "Forward" button contained in the page, the call initiation processing unit 24b performs a process for forwarding the call to the answering phone.

While a confirmation process is performed in the example of an operation that allows the user to confirm the forwarding of the call in order to avoid surprising the user, the call may be forwarded to the answering phone without performing the confirmation process if the users clearly know that their calls may be forwarded to the answering phone.

In the process for forwarding the call to the answering phone, the call initiation processing unit 24b directs the call control server 1 to connect the telephone terminal 7a of the calling user to the answering phone provided by the answering server 8. The calling user may leave a message such as a question about the document.

After the calling user completes recording the message on the answering phone and the connection between the calling user's telephone terminal 7a and the answering phone is disconnected, the call control server 1 sends a disconnection notification to the call initiation processing unit 24b. When the call initiation processing unit 24b receives the disconnection notification, the recording controller 27 sets a text describing the characteristic of the document on the speech synthesis server 9 by using the characteristic data of the document acquired by the document characteristic acquiring unit 21.

For example, the recording controller 27 extracts, from the page indicated by the URL of the document identified by the document characteristic acquiring unit 21, keywords such as the title or the URL of the page of the document or other keywords indicating the content of the page. The extraction may be performed by the document characteristic acquiring unit 21. The extracted keywords are used to generate text data for a message. If the keywords "Announcement of new PC" and "Sales information" are extracted, text data, for example "The message is left by a user who has accessed the "Sales information," concerning "New PC announcement" is generated. The recording controller 27 stores the generated text data on the speech synthesis server 9.

After voice data is stored on the speech synthesis server 9, the call initiation processing unit 24b sends a forward instruction to the call control server 1 to direct the call control server 1 to connect the answering server 8 to the speech synthesis server 9. Once the answering server 8 is connected to the speech synthesis server 9, the speech synthesis server 9 synthesizes a voice message from the stored text data and sends the voice message to the answering server 8. Upon completion of the transmission of the voice message, the connection between the answering server 8 and the speech synthesis server 9 is disconnected.

According to the present disclosure, appropriate call initiation control according to the nature of the call and the status of a called party may be performed.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

The invention claimed is:

1. A communication control system which receives a call initiation request and executes a call initiation process based on the received call initiation request, the communication control system comprising:
   a memory; and
   a processor that executes a procedure including:
      a document characteristic acquiring process that, when receiving a call initiation request including at least information identifying a called party terminal and information concerning a document related to the call initiation request, acquires characteristic data indicating a confidentiality level of the document;
      a called party status acquiring process that acquires status data indicating a location of the called party terminal of the call initiation request;
      a call initiation determining process that determines whether a call requested by the call initiation request is initiated or not based on the confidentiality level indicated by the characteristic data and the location of the called party terminal indicated by the status data; and
      a call initiation process that initiates a call depending on the determination by the call initiation determining process,
      wherein the document characteristic acquiring process receives an address of the document related to the call initiation request, accesses the document based on the address, and acquires the characteristic data of the document based on whether text data in the document includes a specific keyword or not.

2. The communication control system according to claim 1, wherein the document characteristic acquiring process receives data identifying a calling user sending the call initiation request, accesses an access log on a server providing documents accessible to the calling user, identifies the document related to the call initiation request based on the access log of the calling user, and acquires the characteristic data of the identified document.

3. The communication control system according to claim 1, further comprising:
   a recording controller that generates voice data representing information concerning the document related to the call initiation request and records the generated voice data in such a manner as to be accessible to the called party terminal called by the call initiation request, if the call initiation determining process determines that the call requested by the call initiation request should not be initiated.

4. The communication control system according to claim 1, further comprising:
   a special number determining process that determines whether or not a special number is added to the call initiation request and executes the call initiation process without causing the call initiation determining process to make the determination if the special number is added to the call initiation request.

5. A non-transitory computer-readable storage medium storing a communication control program, the communication control program causing a computer to:
   receive, when receiving a call initiation request including at least information identifying a called party terminal and information concerning a document related to the call initiation request, an address of the document;
   access the document based on the address;
   acquire characteristic data of the document based on whether text data in the document includes a specific keyword or not, the characteristic data indicating a confidentiality level of the document;
   acquire status data indicating a location of the called party terminal identified by the call initiation request;
   determine whether a call requested by the call initiation request should be initiated or not based on the confidentiality level indicated by the characteristic data and the location of the called party terminal indicated by the status data; and
   execute a call initiation process depending on the result of the determination as to whether the call requested by the call initiation request should be initiated or not.

6. A call control method performed by a computer which receives a call initiation request and initiates a call based on the received call initiation request, the call control method comprising:
   receiving, by a document characteristic acquiring unit of the computer, when the document characteristic acquiring unit receives a call initiation request including at least information identifying a called party terminal and information concerning the document related to the call initiation request, an address of the document;
   accessing the document based on the address;
   acquiring characteristic data of the document based on whether text data in the document includes a specific keyword or not, the characteristic data indicating a confidentiality level of the document;
   acquiring, by a called party status acquiring unit of the computer, status data indicating a location of the called party terminal identified by the call initiation request;
   determining, by a call initiation determining unit of the computer, whether the call requested by the call initiation request should be initiated or not based on the confidentiality level indicated by the characteristic data and the location of the called party terminal indicated by the status data; and
   executing, by a call initiation processing unit of the computer, a call initiation process depending on the result of the determination as to whether the call requested by the call initiation request should be initiated or not.

* * * * *